United States Patent [19]

Moechnig et al.

[11] Patent Number: 5,997,939
[45] Date of Patent: Dec. 7, 1999

[54] WEATHER-RESISTANT PROTEIN SUPPLEMENT FEEDS, AND METHODS OF MAKING SAME

[75] Inventors: Bruce Willard Moechnig; Qingshan Gao, both of Quincy, Ill.

[73] Assignee: Archer-Daniels-Midland Company, Decatur, Ill.

[21] Appl. No.: 09/199,056

[22] Filed: Nov. 24, 1998

[51] Int. Cl.$^6$ .............................. A23K 1/175; A23J 1/10
[52] U.S. Cl. ......................... 426/656; 426/96; 426/292; 426/303; 426/635; 426/807; 424/438; 424/491
[58] Field of Search .................... 426/289, 292, 426/295, 635, 656, 807, 96, 98, 303; 424/438, 439, 491, 498

[56] References Cited

U.S. PATENT DOCUMENTS

| | | | |
|---|---|---|---|
| Re. 31,804 | 1/1985 | Skoch et al. | 426/658 |
| 2,152,438 | 3/1939 | McHan | 99/4 |
| 2,611,702 | 9/1952 | Potishman | 99/6 |
| 2,744,823 | 5/1956 | Diamond | 99/2 |
| 3,692,526 | 9/1972 | Ulbing | 96/108 |
| 3,728,127 | 4/1973 | Palmer | 99/20 |
| 3,939,285 | 2/1976 | Garrett, Sr. et al. | 426/285 |
| 3,961,081 | 6/1976 | McKenzie | 426/658 |
| 3,973,046 | 8/1976 | Mol | 426/289 |
| 3,989,852 | 11/1976 | Palmer | 426/289 |
| 4,171,385 | 10/1979 | Skoch et al. | 426/658 |
| 4,234,608 | 11/1980 | Linehan | 426/72 |
| 4,252,831 | 2/1981 | Gleckler et al. | 426/74 |
| 4,265,916 | 5/1981 | Skoch et al. | 426/74 |
| 4,582,708 | 4/1986 | Tipton et al. | 426/62 |
| 4,832,967 | 5/1989 | Autant et al. | 426/96 |
| 5,068,114 | 11/1991 | Chanen et al. | 426/69 |
| 5,212,325 | 5/1993 | Lajoie | 554/156 |
| 5,236,723 | 8/1993 | Lajoie et al. | 426/72 |
| 5,250,307 | 10/1993 | Cummings et al. | 426/72 |
| 5,260,089 | 11/1993 | Thornberg | 426/624 |
| 5,380,890 | 1/1995 | Greene et al. | 554/2 |
| 5,380,893 | 1/1995 | Lajoie | 554/156 |
| 5,391,787 | 2/1995 | Vinci et al. | 554/156 |
| 5,391,788 | 2/1995 | Vinci et al. | 554/156 |
| 5,425,963 | 6/1995 | Lajoie | 426/2 |
| 5,456,927 | 10/1995 | Vinci et al. | 426/74 |
| 5,496,572 | 3/1996 | Rudden | 426/74 |
| 5,532,008 | 7/1996 | Sasaoka et al. | 426/73 |
| 5,871,802 | 2/1999 | Gao et al. | 426/635 |
| 5,908,647 | 6/1999 | Golightly | 426/74 |

*Primary Examiner*—Keith D. Hendricks
*Attorney, Agent, or Firm*—Sterne, Kessler, Goldstein & Fox P.L.L.C.

[57] ABSTRACT

Weather-resistant protein supplement feeds for animals and methods of making same are disclosed. A trace mineral premix in the form of free-flowing granules is produced in a series of steps comprising (1) mixing a liquid binder with a relatively coarse granular feed ingredient to provide damp binder-coated cores, (2) while damp, the binder-coated cores are mixed with a trace mineral base mix, (3) the cores with their outer layers of trace minerals are mixed with substances which impart water-resistant sheaths thereto, and (4) dusting powder is applied to complete the formation of trace mineral premix granules. The premix granules are mixed with coarse granular macromineral feed ingredients, iron oxide, liquids including a water-resistant coating solution, and one or more of a proteinaceous ingredient to form weather-resistant protein supplement feed granules. In a preferred embodiment, the water-resistant sheathes are formed by mixing the product of step (2) with a fatty acid and depositing thereon a metal oxide with which it reacts.

16 Claims, 4 Drawing Sheets

WEATHER-RESISTANT PROTEIN SUPPLEMENT FEEDS, AND METHODS OF MAKING SAME

BACKGROUND OF THE INVENTION

1. Field of the Invention

This invention relates to innovations and improvements in water-resistant or weatherized mineral and protein supplement feeds for animals. Such feeds are consumed by animals in pastures, on the range or in feedlots where they are to at least some extent, if not entirely, exposed to the weather.

2. Related Art

Weather-resistant mineral feeds for animals, often referred to as "weatherized minerals" have been available for a number of years. For many years, mineral feed products have been weatherized to reduce losses from wind and rain by application of petrolatum to the minerals and the inclusion of molasses to increase palatability. Ingredients in a typical mineral feed can be categorized in three groups: macrominerals, trace minerals (microminerals) and other functional materials. Macrominerals range in size from fine to coarse granules while trace minerals are usually fine granules or powders. Due to their small size, the major losses from rain leaching or wind erosion occur in the trace minerals.

In the prior procedures for producing weatherized mineral feeds, the first step in the process has been to mix the macro ingredients, micro ingredients, salt, and functional materials. Thereafter, petrolatum and molasses are added to the mixture followed by a period of mixing so as to uniformly distribute the molasses and petrolatum throughout the mix. Heretofore, iron oxide has been included in the formula in order to impart a red color to the final product.

While weatherized or water-resistant mineral feeds formulated and produced in accordance with the prior art have been consumed in large quantities over the years, the finer fraction of such feeds which includes primarily the trace minerals and water soluble components has been susceptible to appreciable rain leaching and wind erosion.

Protein supplementation of range cattle is necessary during periods when the forage available to the animals provides inadequate levels of protein to maintain body weight and performance. Winter is often the time of year when supplementation is most needed. Drought or other poor growing conditions can affect the nutritional composition of forages at other times of the year, leading to the need for protein supplementation.

Most free-choice protein supplements available on the market today are in the form of pressed blocks or tubs. In the pressed block process, dry ingredients are batched and mixed. Molasses and other liquid binders are added and the resultant mixture pressed under high pressure (approx 1500 to 2500 psi). Final moisture content of the product is generally 13% or lower. Standard size of pressed blocks is 33-⅓ lbs.

Most tub products use molasses as the starting material. For these products, two different processes are used to achieve a final solid product. In one process, the molasses is heated to remove water to achieve a moisture content of approximately 3%. Limited quantities of dry ingredients can be blended with the cooked molasses prior to cooling to provide additional minerals, vitamins, protein, or energy (U.S. Pat. No. 3,961,081).

In the other process, highly reactive materials are added to create a chemical reaction that hardens the product. Limited quantities of dry ingredients can be added to provide additional minerals, vitamins, protein, or energy. In this process, limited quantities of moisture are removed in the process (see e.g., U.S. Pat. Nos. 4,171,385; 4,234,608 and 4,265,916).

Another process has been developed by Harvest Fuel, Inc. for producing a tub based on condensed distillers solubles (CDS) instead of molasses. In this process, the CDS is mixed with the dry ingredients to form a mixture at approximately 24% moisture which is then pressed under low pressure to form the final product. Higher levels of dry ingredients can be added to enhance the protein, mineral, and vitamin composition of the product over the molasses-based products (U.S. Pat. No. 5,260,089).

Free-choice tub products are generally 200 to 250 lbs in size, with some as large as 500 lbs. Due to their size, they are more convenient to handle and feed than the smaller pressed blocks. The tub products are generally unaffected by weather, while the pressed blocks tend to fall apart if they get wet.

In some instances, a free-choice protein supplement is desired in meal form. To address this segment of the market, MoorMan's Inc. developed a high-protein supplement called Roughage Buster. Protein contents of 60, 80 and 100% are currently available with the high protein levels achieved through the inclusion of biuret, along with other protein sources.

In the production of Roughage Buster, the dry ingredients are added to the mixer, followed by the addition of molasses and petrolatum. The resultant mixture is a non-dusty product containing a wide range of particle sizes. Distribution of nutrients, particularly the trace minerals, is non-uniform leading to inconsistent mineral intake should segregation of the product occur during handling and feeding. It is also more subject to losses due to wind and water.

SUMMARY OF THE INVENTIONS

The objects of the inventions are to provide the following improvements in weather-resistant or weatherized mineral and protein supplement feeds for animals and methods of producing the same:

An improved process that reduces the loss of water soluble components of an animal mineral feed mixture when exposed to rain/snow/sleet. This improvement is achieved through the agglomeration of the water soluble components onto a coarse particle which is then coated to form a water-resistant layer.

An improved process that reduces the loss of mineral components of an animal mineral feed mixture by preventing the mineral components from being readily airborne when exposed to wind. This improvement is due to the enlarged particle size resulting from the agglomeration of the fine components to the solid particle base.

An improved animal mineral feed product with reduced dustiness.

An improved animal mineral feed product that is less susceptible to chemical reaction with other feed ingredients due to the weather-resistant coating.

A readily-consumed animal feed consisting of agglomerated, coated particles mixed with coarse water insoluble macro mineral sources in granular form (e.g. limestone, dicalcium phosphate, bone meal, etc.)

An improved animal mineral feed product that is less corrosive to feeders due to coating of water soluble components with hydrophobic coating.

An improved animal mineral feed product with reduced tendency for segregation of mineral components.

An improved animal mineral feed product with reduced electrostatic tendency to minimize accumulations of fine materials on metal surfaces where they may build up and corrode feeders.

Improved animal mineral feed products that may be produced and fed in free flowing form and also in other forms including tubs, blocks, pellets and cubes.

In accordance with the present invention, a premix is first formed which serves as a water and weather-resistant carrier for trace minerals and other ingredients which are highly susceptible to loss due to rain and wind. After the free-flowing premix has been formed, it is mixed with relatively coarse macrominerals and iron oxide in the presence of a water-resistant coating solution.

The core or center base for the premix in the present invention is a coarse, dry, granular product having a particle size range of 7–30 mesh with 10–20 mesh preferred. Typical core materials may include salt, dicalcium phosphate, granular limestone and magnesium oxide. Since salt is a common ingredient of mineral feeds for animals, coarse salt such as food grade pretzel salt with a particle size range of 12–20 mesh will serve as a solid base core on which the trace minerals and other water susceptible ingredients may be agglomerated. In the agglomeration process, coarse salt and/or other coarse core material such as dicalcium phosphate are first mixed with a liquid binder such as a condensed byproduct from the grain, food or feed processing industries including, for example, Brewex (a condensed molasses-like by-product of the brewing industry), corn steep liquor, condensed porcine solubles, molasses, or condensed distillers solubles. The liquid binder will leave the core particles in a damp condition suitable for mixing with a trace mineral and dry binder base mix. Trace minerals may include materials such as cobalt carbonate, copper sulfate, potassium iodide, iron sulfate, manganous oxide, and zinc oxide. In addition, as part of the trace mineral base mix, nutrients and/or known feed additives may be included. Dry binder may be used in the base mix to provide more adhesive force to help agglomeration of the trace mineral particles onto the core particles. The dry binder may be hygroscopic fine powders such as whey permeate, dry calcium lignin sulfonate, corn syrup solids or whole whey.

After forming the coarse granules with their deposits of trace minerals, a protective layer is applied to the granules. The formation of this protective layer may be achieved through any of several methods. In one embodiment, the layer is formed by adding a metal oxide powder to the granules, followed by adding a fatty acid. The chemical reaction between the metal oxide and the fatty acids forms a coating in the form of a water-resistant soap. Alternatively, saturated hydrocarbons such as petrolatum or paraffin wax may be mixed with the granules to form a water-resistant coating.

In order to produce the premix in a dry, free-flowing form, the resulting protected granules are blended with a dusting powder. The dusting powder may be any of several fine organic, or inorganic materials such as starches, clays, talc or diatomaceous earth. The resulting premix will be in the form of coarse dry particles or granules having solid core centers.

A further objective of the invention is to provide significant improvements in the Roughage Buster products. In this embodiment of the invention, the trace minerals in the product are first agglomerated to a portion of the coarse dical called for in the formula. The resultant granules are then coated with a layer of petrolatum to impart weather resistance. This portion of the process is the same as that described herein for weather-resistant mineral feeds.

The final step of the process for protein supplement products differs from that of mineral feeds in that proteinaceous ingredients are included in the mix, along with minerals, in sufficient quantities to adequately supplement the protein needs of the animal. The proteinaceous ingredients are mixed with the agglomerated dical/trace mineral premix and additional minerals to yield the final product. The proteinaceous sources can be plant-based (e.g. soybean meal, cottonseed meal, linseed meal), animal-based (e.g. meat and bone meal, blood meal, feather meal) or non-protein nitrogen (e.g. urea, biuret). Liquids are added to the blend of dry ingredients to impart weather resistance and palatability. Petrolatum is typically used to impart weatherization while molasses is typically used to improve palatability and acceptance by the animal.

The resultant product is an Improved Roughage Buster with the following advantages:

Reduced loss of protein and mineral due to wind as a result of the larger mean particle size in the mixture;

Reduced leaching losses in the product as a result of the larger particle size in the mixture and the use of petrolatum to protect the product;

Improve distribution of nutrients leading to more uniform intake as a result of agglomeration of the trace minerals to the coarse dical; and Reduced tendency to segregate during handling and feeding due to larger more uniform particle size.

In a further improvement of this invention, the proteinaceous ingredients, trace mineral base mix, and additional minerals and optionally iron oxide are mixed with the premix cores. Liquids are added to the blend of dry ingredients to impart weather resistance and palatability. Petroleum is typically used to impart weatherization while molasses is typically used to improve palatability and acceptance by the animal.

DETAILED DESCRIPTION OF THE PREFERRED EMBODIMENTS

Figure 1:
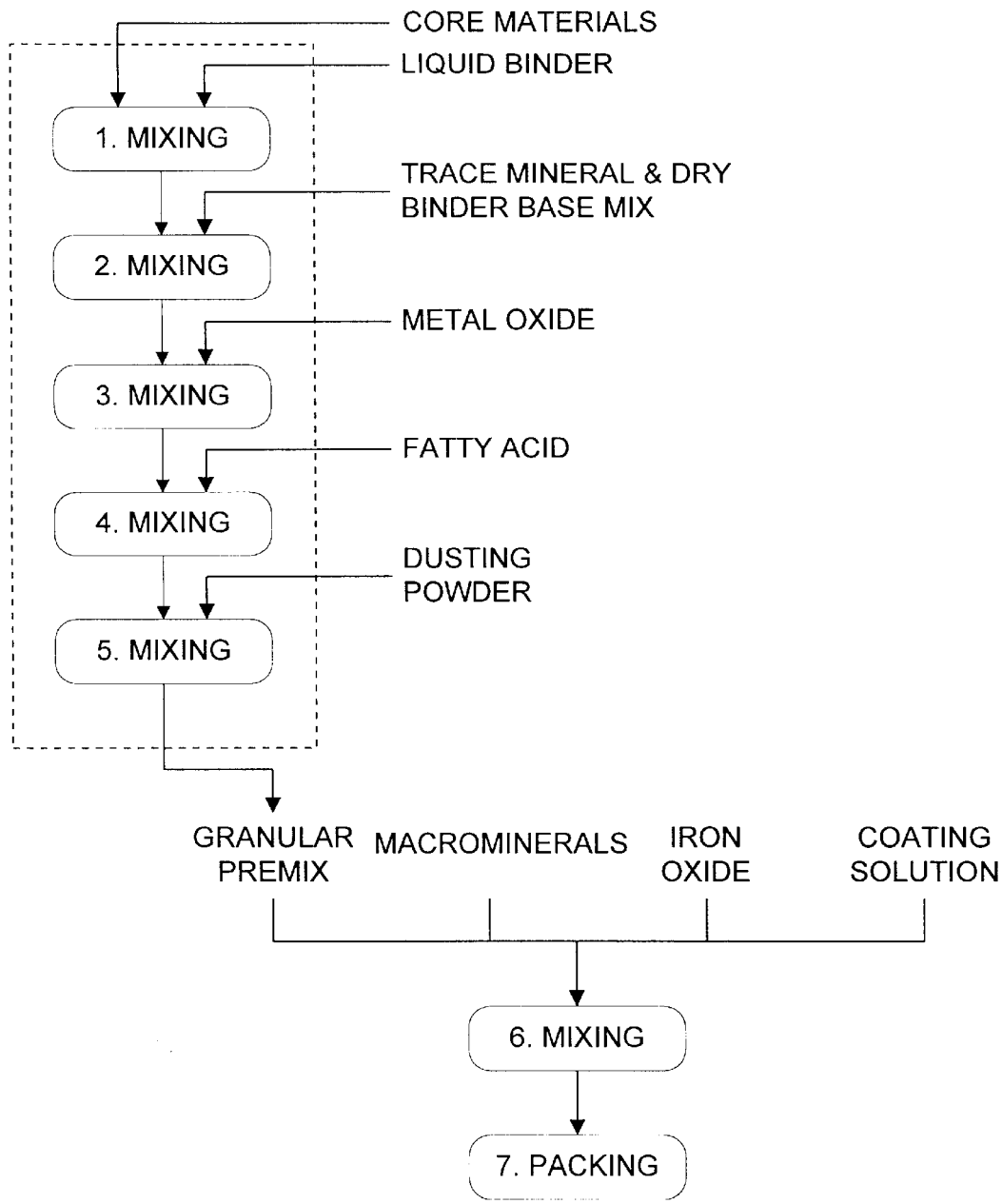
FIG. 1 is a flow diagram of a presently preferred process according to the invention.

The present invention relates to water-resistant or weatherized mineral and protein supplement feeds for animals.

In one embodiment, the present invention relates to a method of making a trace mineral premix in the form of free-flowing granules for incorporation in a weather-resistant mineral feed for animals comprising the following series of steps:

(a) mixing a liquid binder with a relatively coarse granular feed ingredient to provide damp binder-coated cores;

(b) mixing the damp binder-coated cores of step (a) with a trace mineral base mix to provide said cores with a layer of trace minerals; and (c) mixing the product of step (b) with substances which form a water-resistant sheath over said layers of trace minerals.

In a preferred embodiment, the above-described method further comprising the step of mixing the product of said step (c) with a dusting powder to form a dust layer over said water-resistant sheath.

In a further embodiment, the present invention relates to a method of making a trace mineral premix in the form of free-flowing granules for incorporation in a weather-resistant mineral feed for animals comprising the following series of steps:

(a) mixing a liquid binder with a relatively coarse granular feed ingredient to provide damp binder-coated cores;

(b) mixing the damp binder-coated cores of step (a) with a trace mineral base mix to provide said cores with a layer of trace minerals;

(c) mixing the product of step (b) with a metal oxide; and (d) mixing the product of step (c) with a fatty acid and allowing said metal oxide and fatty acid to react and form a water-insoluble coating on the product of step (b).

In another embodiment, the present invention relates to a method of making a trace mineral premix in the form of free-flowing granules for incorporation in a weather-resistant mineral feed for animals comprising the following series of steps;

(b) mixing a liquid binder with a relatively coarse granular feed ingredient to provide damp binder-coated cores;

(c) mixing the damp binder-coated cores of step (a) with a trace mineral base mix to provide said cores with a layer of trace minerals;

(d) mixing the product of step (b) with a dusting material; and (e) mixing the product of step (c) with a hydrocarbon of the group comprising petrolatum and paraffin to form a water-resistant sheath over said dusted layer of trace minerals.

In a preferred embodiment, the above-described methods further comprise the step of mixing the product of said step (d) with a dusting powder to form a dust layer over said water-resistant sheath.

In another embodiment, the present invention relates to a trace mineral premix made in accordance with any one of the above-described methods.

In another embodiment, the present invention relates to a method of making a weather-resistant mineral feed for animals comprising mixing said premix granules made in accordance with any of the above-described methods with coarse granular macromineral feed ingredients and a water-resistant coating solution.

In a preferred embodiment, the above-described methods further comprise mixing said premix granules with iron oxide.

In another embodiment, the present invention relates to a method of making a weather-resistant mineral feed for animals comprising the following series of steps:

(a) mixing a liquid binder with a relatively coarse granular feed ingredient to provide damp binder-coated cores; and (b) mixing the damp binder-coated cores of step (a) with a coarse granular macromineral feed ingredients, and substances which form a water-resistant sheath.

In a preferred embodiment, the above-described method further comprises at step (b) mixing the damp binder-coated cores with a trace mineral base mix. In another preferred embodiment, the above-described methods further comprise adding to the binder cores in step (b) iron oxide.

In another embodiment, the present invention relates to weather-resistant mineral feed for animals made in accordance with the any of the above-described methods.

In a further embodiment, the present invention relates to a method of making a weather-resistant protein supplement feed for animals which comprises mixing said premix granules made in accordance with the any of the above-described methods with one or more proteinaceous ingredients in a quantity sufficient to supplement the protein needs of said animals and a water-resistant coating solution.

In a preferred embodiment, the above-described methods further comprise mixing said premix granules with coarse granular macromineral feed ingredients. In another preferred embodiment, the above-described methods further comprise mixing said premix granules with iron oxide. In another preferred embodiment, the proteinaceous ingredient of the above-described methods is selected from the group consisting of soybean meal, cottonseed meal, meat meal, bone meal, blood meal, feather meal, urea and biuret.

In another embodiment, the present invention relates to a weather-resistant protein supplement animal feed made in accordance with the method of any of the above described methods.

In another embodiment, the present invention relates to a method of making a weather-resistant protein supplement feed for animals comprising the following series of steps:

(a) mixing a liquid binder with a relatively coarse granular feed ingredient to provide damp binder-coated cores; and (b) mixing the damp binder-coated cores of step (a) with a water-resistant coating solution and one or more of a proteinaceous ingredient in a quantity sufficient to supplement the protein needs of said animals.

In a preferred embodiment, the above-described methods further comprise mixing said damp binder-coated cores with a trace mineral base mix. In a further preferred embodiment, the above-described methods further comprise mixing the damp binder-coated cores with coarse granular macromineral feed ingredients. In another preferred embodiment, the above-described methods further comprise mixing said damp binder-coated cores with iron oxide. In another preferred embodiment, the above-described methods further comprise the step of mixing the product of step (b) with a dusting powder. In another preferred embodiment, the proteinaceous ingredient in the above-described methods is selected from the group consisting of soybean meal, cottonseed meal, meat meal, bone meal, blood meal, feather meal, urea and biuret.

In another embodiment, the present invention relates to a weather-resistant protein supplement animal feed made in accordance with any of the above-described methods.

A key problem connected with weatherized mineral feeds that have previously been available has been their susceptibility to loss of their content of trace minerals due to rain and wind. This problem has been overcome in accordance with the present invention by the preparation of a premix in the form of granules or particles formed of relatively coarse centers or cores on which the trace minerals and related ingredients are deposited with the particles having a weather-resistant exterior sheath or protective coating. Once a premix composed of such particles or granules has been formed, it may be readily mixed with the remaining components of the weatherized mineral feed, namely, macro-minerals and iron oxide and a suitable water-resistant coating composition.

Figure 3:
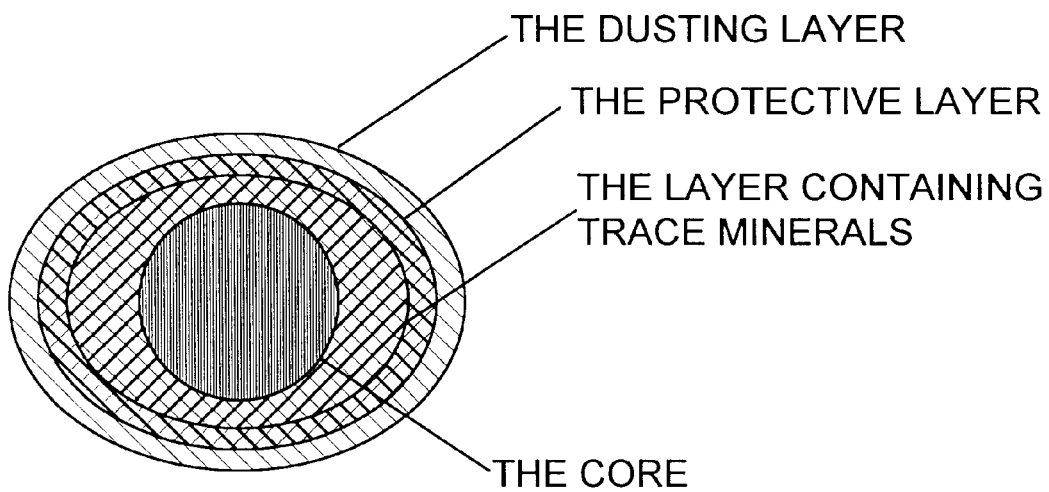
FIG. 3 is a diagrammatic representation of the structure of the granules or particles of premix formed in accordance with the invention.

The structure of a premix particle or granule formed in accordance with the invention is illustrated in FIG. 3. As stated above, the core or center of the premix granule or particle is formed of a suitable coarse feed ingredient such as salt, dicalcium phosphate, granular limestone or magnesium oxide, or mixtures thereof. As indicated, the core has a layer containing trace minerals on it, which in turn is encased in a water resistant sheath. The water-resistant sheath may consist of a soap formed by the reaction of metal oxide with fatty acids or a saturated hydrocarbon such as petrolatum or paraffin wax. In order to render the granules or particles free-flowing for easy mixing with other ingredients, the protective layer is covered with a dusting layer provided by one or more of the above-mentioned dusting powders, starch being a preferred material.

A suitable premix of the invention is formed in five distinct steps as shown in FIG. 1. If desired, all of these steps can be carried out in the same mixer which can be one of several known type mixers which are commercially available.

Step 1. To a predetermined quantity of core material (10–20 mesh) liquid binder 5 is added with mixing for approximately 1–2 minutes.

Step 2. In this step, a trace mineral base mix and dry binder are mixed with the product of Step 1 for approximately 1 to 2 minutes. Trace minerals may include one or more of those mentioned above. In addition, as part of the trace mineral base mix, nutrients and/or feed additives may be included. The nutrients added may include such components as macro minerals that are water soluble, vitamins, microbials and amino acids. Feed additives may include such components as ionophores, antibiotics or feedthrough anthelmentics.

It has been found that when a dry binder is used in the process it not only absorbs moisture from the liquid binder and holds the moisture, preventing (or retarding) the moisture from acting on the core material, but it also assists in adhering the trace minerals particles to the core. With or without a dry binder, moist agglomerated particles are produced at the end of Step 2.

Step 3. In this step, a soap forming metal oxide such as calcium oxide or magnesium oxide is mixed with the product of Step 2 for approximately 1 minute.

Step 4. In this step, a fatty acid is added to the mixture from Step 3 with mixing for 1–2 minutes. Unsaturated fatty acids that readily react with the metal oxide to form water insoluble soaps are desired. Specifically, purified free fatty acids and acidulated soapstocks have been found to be desirable. The reaction between the metal oxide and the fatty acid may be hastened by the addition of heat to the mixture.

Step 5. In order to form or convert the product of Step 4 into free-flowing premix granules or particles suitable for mixing with other components, the product of Step 4 is mixed with a suitable dusting powder such as starch, clays, talc, or diatomaccous earth.

The premix granules from Steps 1–5 are mixed for approximately 3–5 minutes with macrominerals, iron oxide and a water-resistant coating solution. The macrominerals will usually be one or more of the following: limestone, magnesium oxide, dicalcium phosphate bone meal, potassium chloride, monoamonium phosphate, salt, ammonium chloride, magnesium sulfate, or defluorinated phosphate. The iron oxide is included primarily in order to impart a desirable red color to the finished product. As suitable coating solutions for step 6, petrolatum and various lipid solutions can be used such as a fat-lecithin solution or a fat-lecithin molasses solution.

Following completion of step 6, the product is in condition for packing and shipment.

As a modification of the process of FIG. 1, the dry binder may be separately admixed with the coarse core or center material prior to addition and mixing with the liquid binder.

Figure 2:
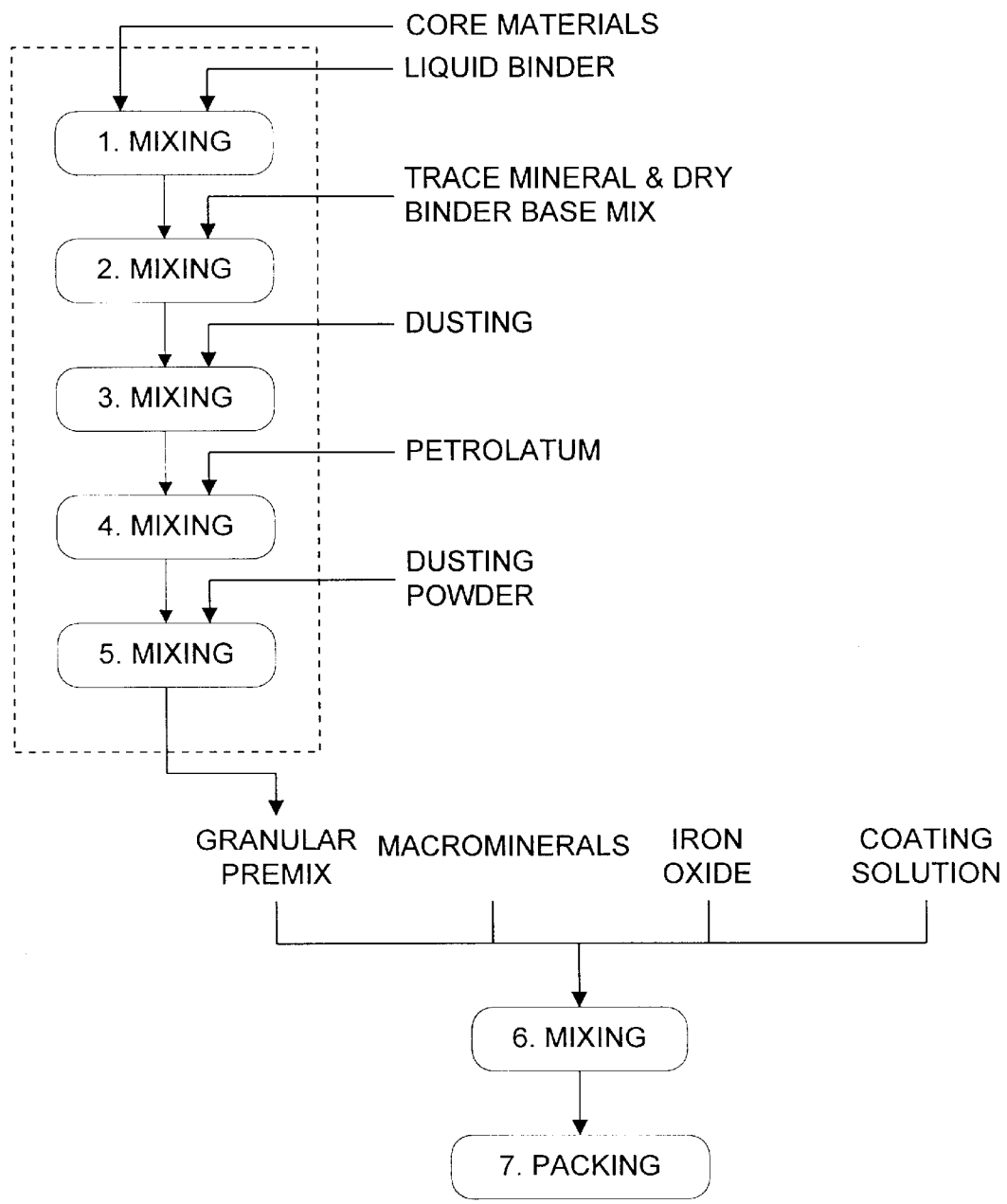
FIG. 2 is a flow diagram of a process forming another embodiment of the invention.

In the flow diagram of FIG. 2, in Step 3 a dusting powder which may be magnesium oxide is mixed with the granules from Step 2. In Step 4 a saturated hydrocarbon such as petrolatum or paraffin is mixed with the granules from Step 3.

Figure 4:
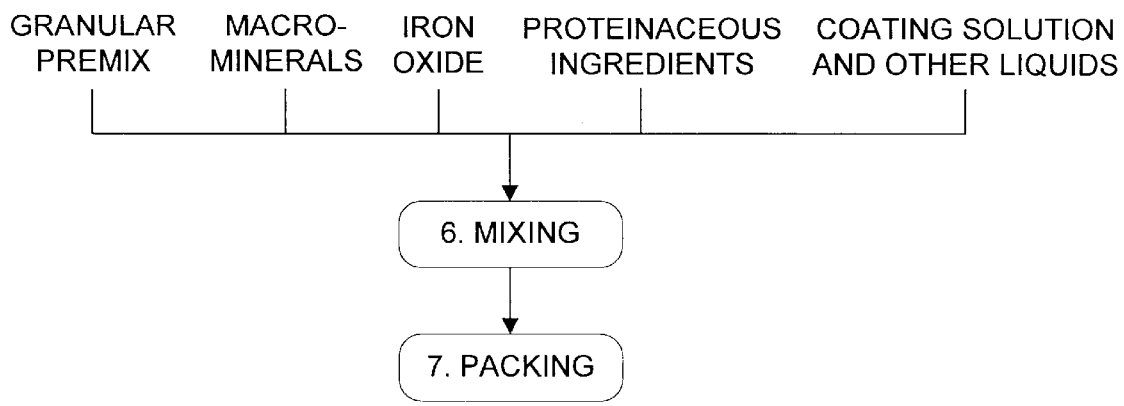
FIG. 4 is a flow diagram of a process forming weather-resistant protein products.

In a further improvement of this invention, a weather-resistant protein supplement feed may be produced by the process of FIG. 4. The granular premix of the invention is mixed with macrominerals, iron oxide, and proteinaceous ingredients in sufficient quantities to adequately supplement the protein needs of the animal. Liquids are added to the blend of dry ingredients to impart weatherization, and molasses is typically used to improve palatability and acceptance by the animal.

Following completion of Step 6, the product is in condition for packaging and shipment.

The present invention is described in further detail in the following non-limiting examples.

EXAMPLES

Examples 1–4 Relate to the Making of a Mineral Supplement

Example 1

Making of the Granular Premix

| Ingredient | % by weight |
| --- | --- |
| Salt (10–20 mesh) | 50–75 |
| Brewex | 4–7 |
| Trace Mineral Base Mix | 5–30 |
| Magnesium Oxide | 3–10 |
| Soapstock | 3–10 |
| Starch | 1–5 |

1) Add salt into a mixer
2) Add brewex into mixer, mix 1–2 min.
3) Add trace mineral base mix into the mixer, mix 1–2 min.
4) Add magnesium oxide into the mixer, mix 1 min.
5) Add soapstock into the mixer, mix 1–2 min.
6) Add starch into the mixer, mix 1 min.

Making of the Final Mineral Mix

| Ingredient | % by weight |
| --- | --- |
| Granular Premix | 15–35 |
| Dicalcium Phosphate | 10–50 |
| Limestone | 10–50 |
| Defluorinated Phosphate | .5–5 |
| Iron Oxide | .5–1.5 |
| Petrolatum | 1.5–3 |

1) Add all of the ingredients except petrolatum into a mixer, mix 1 min.
2) Add petrolatum into the mixer, mix 3 min.

Example 2

Making of the Granular Premix

| Ingredient | % by weight |
| --- | --- |
| Salt (10–20 mesh) | 55.5 |
| Brewex | 5.5 |
| Trace Mineral Base Mix | 25.0 |
| Magnesium Oxide | 6.0 |
| Soapstock | 4.0 |
| Starch | 4.0 |

1) Add salt into a mixer
2) Add brewex into mixer, mix 1–2 min.
3) Add trace mineral base mix into the mixer, mix 1–2 min.
4) Add magnesium oxide into the mixer, mix 1 min.
5) Add soapstock into the mixer, mix 1–2 min.
6) Add starch into the mixer, mix 1 min.

Making of the Final Mineral Mix

| Ingredient | % by weight |
| --- | --- |
| Granular Premix | 26.2 |
| Dicalcium Phosphate | 38.3 |
| Limestone | 31.0 |
| Defluorinated Phosphate | 1.0 |
| Iron Oxide | 1.0 |
| Petrolatum | 2.5 |

1) Add all of the ingredients except petrolatum into a mixer, mix 1 min.
2) Add petrolatum into the mixer, mix 3 min.

Example 3

Making of the Granular Premix

| Ingredient | % by weight |
| --- | --- |
| Coarse Dicalcium Phosphate | 50–75 |
| Brewex | 4–10 |
| Trace Mineral Base Mix | 5–30 |
| Magnesium Oxide | 3–10 |
| Petrolatum | 1–3 |

1) Add coarse dicalcium phosphate into a mixer.
2) Add brewex into mixer, mix 1–2 min.
3) Add trace mineral base mix into the mixer, mix 1 min.
4) Add magnesium oxide into the mixer, mix 1 min.
5) Add petrolatum into the mixer, mix 1–2 min.

Making of the Final Mineral Mix

| Ingredient | % by weight |
| --- | --- |
| Granular Premix | 15–35 |
| Dicalcium Phosphate | 10–50 |
| Limestone | 10–50 |
| Salt | 1–20 |
| Defluorinated Phosphate | .5–5 |
| Iron Oxide | .5–1.5 |
| Petrolatum | 1.5–3 |

1) Add all of the ingredients except petrolatum into a mixer, mix 1 min.
2) Add petrolatum into the mixer, mix 3 min.

Example 4

Making of the Granular Premix

| Ingredient | % by weight |
| --- | --- |
| Coarse Dicalcium Phosphate | 60.8 |
| Brewex | 6.7 |
| Trace Mineral Base Mix | 25.0 |
| Magnesium Oxide | 5.0 |
| Petrolatum | 2.5 |

1) Add coarse dicalcium phosphate into a mixer.
2) Add brewex into mixer, mix 1–2 min.
3) Add trace mineral base mix into the mixer, mix 1–2 min.
4) Add magnesium oxide into the mixer, mix 1 min.
5) Add petrolatum into the mixer, mix 1–2 min.

Making of the Final Mineral Mix

| Ingredient | % by weight |
| --- | --- |
| Granular Premix | 26.2 |
| Dicalcium Phosphate | 23.3 |
| Limestone | 31.0 |
| Salt | 15.0 |
| Defluorinated Phosphate | 1.0 |
| Iron Oxide | 1.0 |
| Petrolatum | 2.5 |

1) Add all of the ingredients except petrolatum into a mixer, mix 1 min.
2) Add petrolatum into the mixer, mix 3 min.

Examples 5–6 Relate to the Making of a Protein Supplement

Example 5

Making of the Granular Premix

| Ingredient | % by weight |
| --- | --- |
| Coarse Dicalcium Phosphate | 50–75 |
| Brewex | 4–10 |
| Roughage Buster | 5–30 |
| Trace Mineral Base Mix | |
| Micro–lite | 3–10 |
| Petrolatum | 1–3 |

1) Add coarse dicalcium phosphate into a mixer.
2) Add brewex into the mixer, mix 2 min.
3) Add the trace mineral base mix into the mixer, mix 3 min.
4) Add 4% micro-lite into the mixer, mix 2 min.

5) Add petrolatum into the mixer, mix 2 min.
6) Add 3% micro-lite into the mixer, mix 2 min.

Making of the Final Mix

| Ingredient | % by weight |
|---|---|
| Calcium Sulfate | 0–10 |
| Dicalcium Phosphate | 1–20 |
| Granular Limestone | 1–15 |
| Defluorinated Phosphate | 0–5 |
| Salt | 1–20 |
| Granular Premix | 10–25 |
| Biuret | 1–60 |
| Molasses | 1–4 |
| Petrolatum | 1–2.5 |
| Iron oxide | 0–1 |
| Cottonseed Meal | 0–35 |
| Soybean Meal | 0–35 |

1) Add all of the ingredients except petrolatum and molasses into a mixer, mix 2 min.
2) Add molasses and petrolatum into the mixer, mix 4 min.

Example 6

Making of the Granular Premix

| Ingredient | % by weight |
|---|---|
| Coarse Dicalcium Phosphate | 60.0 |
| Brewex | 6.0 |
| Roughage Buster | 25.0 |
| Trace Mineral Base Mix | |
| Micro-lite | 7.0 |
| Petrolatum | 2.0 |

1) Add coarse dicalcium phosphate into a mixer.
2) Add brewex into the mixer, mix 2 min.
3) Add the trace mineral base mix into the mixer, mix 3 min.
4) Add 4% micro-lite into the mixer, mix 2 min.
5) Add petrolatum into the mixer, mix 2 min.
6) Add 3% micro-lite into the mixer, mix 2 min.

Making of the Final Mix

| Ingredient | % by weight |
|---|---|
| Calcium Sulfate | 2.0 |
| Dicalcium Phosphate | 8.8 |
| Granular Limestone | 1.9 |
| Defluorinated Phosphate | 0.5 |
| Salt | 4.6 |
| Granular Premix | 16.0 |
| Biuret | 26.7 |
| Molasses | 2.0 |
| Petrolatum | 2.0 |
| Iron oxide | 0.5 |
| Cottonseed Meal | 5.5 |
| Soybean Meal | 29.5 |

1) Add all of the ingredients except petrolatum and molasses into a mixer, mix 2 min.
2) Add molasses and petrolatum int the mixer, mix 4 min.

All publications mentioned hereinabove are hereby incorporated in their entirety by reference.

In view of the foregoing description taken with the examples and accompanying drawing, those skilled in the art will be able to practice the invention in various embodiments without departing from the spirit and scope of the invention as defined in the appended claims.

What is claimed is:

1. A method of making a weather-resistant protein supplement feed for animals comprising the following series of steps:
    (a) mixing a liquid binder with a relatively coarse granular feed ingredient to provide damp binder-coated cores;
    (b) mixing the damp binder-coated cores of step (a) with a trace mineral base mix to provide said cores with a layer of trace minerals;
    (c) mixing the product of step (b) with substances which form a water-resistant sheath over said layers of trace minerals;
    (d) mixing the product of step (c) with a dusting powder forming a dust layer over said water-resistant sheaths to provide free-flowing premix granules; and
    (e) mixing said premix granules with coarse granular macromineral feed ingredients, a water-resistant coating solution, and one or more of a proteinaceous ingredient in a quantity sufficient to supplement the protein needs of said animals.

2. The method of claim 1, further comprising mixing said premix granules with iron oxide.

3. The method of claim 1, wherein said proteinaceous ingredient is selected from the group consisting of soybean meal, cottonseed meal, meat meal, bone meal, blood meal, feather meal, urea and biuret.

4. A method of making a weather-resistant protein supplement feed for animals comprising the following series of steps:
    (a) mixing a liquid binder with a relatively coarse granular feed ingredient to provide damp binder-coated cores;
    (b) mixing the damp binder-coated cores of step (a) with a trace mineral base mix to provide said cores with a layer of trace minerals;
    (c) mixing the product of step (b) with a metal oxide;
    (d) mixing the product of step (c) with a fatty acid, wherein said metal oxide and fatty acid react to and form a water-insoluble coating on the product of step (b);
    (e) mixing the product of step (d) with a dusting powder to provide free-flowing premix granules; and
    (f) mixing said premix granules with coarse granular macromineral feed ingredients, a water-resistant coating solution, and one or more of a proteinaceous ingredient in a quantity sufficient to supplement the protein needs of said animals.

5. The method of claim 4, further comprising mixing said premix granules with iron oxide.

6. The method of claim 4, wherein said proteinaceous ingredient is selected from the group consisting of soybean meal, cottonseed meal, meat meal, bone meal, blood meal, feather meal, urea and biuret.

7. A method of making a weather-resistant protein supplement feed for animals comprising the following series of steps;
    (a) mixing a liquid binder with a relatively coarse granular feed ingredient to provide damp binder-coated cores;
    (b) mixing the damp binder-coated cores of step (a) with a trace mineral base mix to provide said cores with a layer of trace minerals;
    (c) mixing the product of step (b) with a dusting material;
    (d) mixing the product of step (c) with a saturated hydrocarbon to form a water-resistant sheath over said dusted layer of trace minerals;

(e) mixing the product of step (d) with a dusting powder to provide free-flowing premix granules; and (f) mixing said premix granules with coarse granular macromineral feed ingredients, a water-resistant coating solution, and one or more of a proteinaceous ingredient in a quantity sufficient to supplement the protein needs of said animals.

8. The method of claim 7, further comprising mixing said premix granules with iron oxide.

9. The method of claim 7 wherein said proteinaceous ingredient is selected from the group consisting of soybean meal, cottonseed meal, meat meal, bone meal, blood meal, feather meal, urea and biuret.

10. A method of making a weather resistant protein supplement feed for animals comprising the following series of steps:

(a) mixing a liquid binder with a relatively coarse granular feed ingredient to provide damp binder-coated cores; and (b) mixing the damp binder-coated cores of step (a) with a water-resistant coating solution and one or more of a proteinaceous ingredient in a quantity sufficient to supplement the protein needs of said animals.

11. The method of claim 10, further comprising mixing said damp binder-coated cores with a trace mineral base mix.

12. The method of claim 10, further comprising mixing said damp binder-coated cores with coarse macromineral feed ingredients.

13. The method of claim 10, further comprising mixing said damp binder-coated cores with iron oxide.

14. The method of claim 10, further comprising the step of mixing the product of step (b) with a dusting powder.

15. The method of claim 10 wherein said proteinaceous ingredient is selected from the group consisting of soybean meal, cottonseed meal, meat meal, bone meal, blood meal, feather meal, urea and biuret.

16. A weather-resistant protein supplement animal feed made by the method of any one of claims 1,4,7 or 10.

* * * * *